United States Patent [19]

Jovanovic

[11] Patent Number: 4,574,175
[45] Date of Patent: Mar. 4, 1986

[54] RESISTANCE WELDING APPARATUS

[75] Inventor: Milenko Jovanovic, Augsburg, Fed. Rep. of Germany

[73] Assignee: Bayerische Motoren Werke Aktiengesellschaft, Fed. Rep. of Germany

[21] Appl. No.: 602,504

[22] Filed: Apr. 20, 1984

[30] Foreign Application Priority Data

Apr. 22, 1983 [DE] Fed. Rep. of Germany ....... 3314646

[51] Int. Cl.$^4$ ............................................. B23K 11/10
[52] U.S. Cl. .................................. 219/86.1; 219/86.25
[58] Field of Search ................. 219/86.1, 86.25, 86.33, 219/86.51, 86.61, 90; 901/42

[56] References Cited

U.S. PATENT DOCUMENTS 2,163,863  6/1939  Biederman ........................ 219/86.1
4,349,718  9/1982  Carota et al. ..................... 219/90 X

FOREIGN PATENT DOCUMENTS 2717453  7/1979  Fed. Rep. of Germany .
703653   2/1949  United Kingdom .
502729   4/1976  U.S.S.R. .......................... 219/86.25

Primary Examiner—Clifford C. Shaw
Assistant Examiner—C. M. Sigda
Attorney, Agent, or Firm—Craig & Burns

[57] ABSTRACT

A resistance welding apparatus in which an actuatable swivel arm carries a welding electrode approximately perpendicular thereto which operates preferably against a fixed counter electrode. In order to significantly reduce bending stresses and wear at the electrode tip, a welding electrode 1 is pivotal within limits with respect to the swivel arm against the action of a spring element by way of a hinge joint arranged approximately in the electrode axis.

27 Claims, 3 Drawing Figures

RESISTANCE WELDING APPARATUS

The present invention relates to a resistance welding apparatus, especially of sheet metal parts, with an actuatable pivot arm that carries a welding electrode extending at least approximately perpendicular thereto and movable within limits with respect thereto against a spring force.

Such apparatus are disclosed, for example, from the U.S. Pat. No. 2,474,340, in which the welding electrode is longitudinally displaceable within limits with respect to the pivot arm in the direction of the electrode axis against the effect of a spring.

It is also known already from the German Pat. No. 27 17 453 to provide a support for the welding electrode which is pivotal with rspect to the pivot arm, properly speaking, against a spring force about an axis which, however, is located comparatively close to the pivot axis of the pivot arm.

In particular with resistance welding apparatus according to the last-mentioned publication, in which the pivot arm carrying the welding electrode forms a so-called half-tong electrode holder guided by a welding robot, which operates against a stationary copper base, difficulties still occur in the practical operation. The pivot axis of the pivot arm thereby forms the "last" axis of rotation of the welding robot operating with many axes of rotation and degrees of freedom. As a result of unavoidable elasticities of the entire robot frame and as a result of bearing play in the pivot axes, in the course of the contact pressure of the welding electrode against the sheet metal parts to be welded together, the pivot axis of the pivot arm may be displaced relative to the electrode tip already securely seated on the sheet metal parts by reason of the not inconsiderable welding force. As a result thereof, the welding electrode which no longer can nor should be able to follow laterally on the sheet metal part, may be subjected to strong lateral forces which causes an increased wear as also a deformation of the welding electrode so that the repeating accuracy is impaired and a trouble-free operation is possible only over a relatively short period of time.

Accordingly, it is an object of the present invention to provide resistance welding apparatus of the type described above, by means of which the bending moments exerted on the welding electrode can be considerably decreased and a high spot-repeating accuracy as well as a long service life of the electrodes is possible.

The underlying problems are solved according to the present invention in that the welding electrode is pivotal within limits with respect to the pivot arm about a joint arranged approximately in the electrode axis.

As a result of the joint located approximately in the electrode axis, about which the welding electrode is pivotal within limits with respect to the pivot arm against a spring force, a slight change of the distance of the pivot arm to the electrode tip which is caused by machine elasticities and the like, will now have an effect only to the extent that the angle subtended in the normal position between the pivot arm and the welding electrode, changes by the required amount, i.e., no longer remains fixed as with the types of constructions known heretofore. This leads to a significant reduction of the bending stresses exerted by the pivot arm on the welding electrode.

In a preferred embodiment according to the present invention, the joint is a swivel joint with an axis of rotation perpendicular to the electrode axis, which extends parallel to the pivot axis of the pivot arm. The "migration" of the last axis of rotation of the welding robot, described hereinabove, under the effect of the contact pressure of the electrode on the sheet metal parts to be welded together, takes place frequently at least approximately in the pivot plane of the pivot arm so that the relative swivel movement of the welding electrode with respect to the pivot arm, which prevents the bending of the electrode, can take place in the same plane owing to the described position of the axes of rotation.

According to a further advantageous construction in accordance with the present invention, the welding electrode is mounted in a swivel or pivot support which in its turn is pivotal within limits with respect to the pivot arm against the action of a spring. The swivel support and the pivot arm thereby have appropriately fixed abutment surfaces coordinated to one another, at which the swivel support and the pivot arm are pressed against one another in the normal position by the spring element. It is assured thereby that the welding tip has an always accurately defined position relative to the pivot arm at least in the starting position notwithstanding its limited pivotability with respect to the pivot arm. The electrode therefore assumes always an unequivocal starting position when approaching the respective welding position.

These and further objects, features and advantages of the present invention will become more apparent from the following description when taken in connection with the accompanying drawing which shows, for purposes of illustration only, two embodiments in accordance with the present invention, and wherein.

Figure 1:
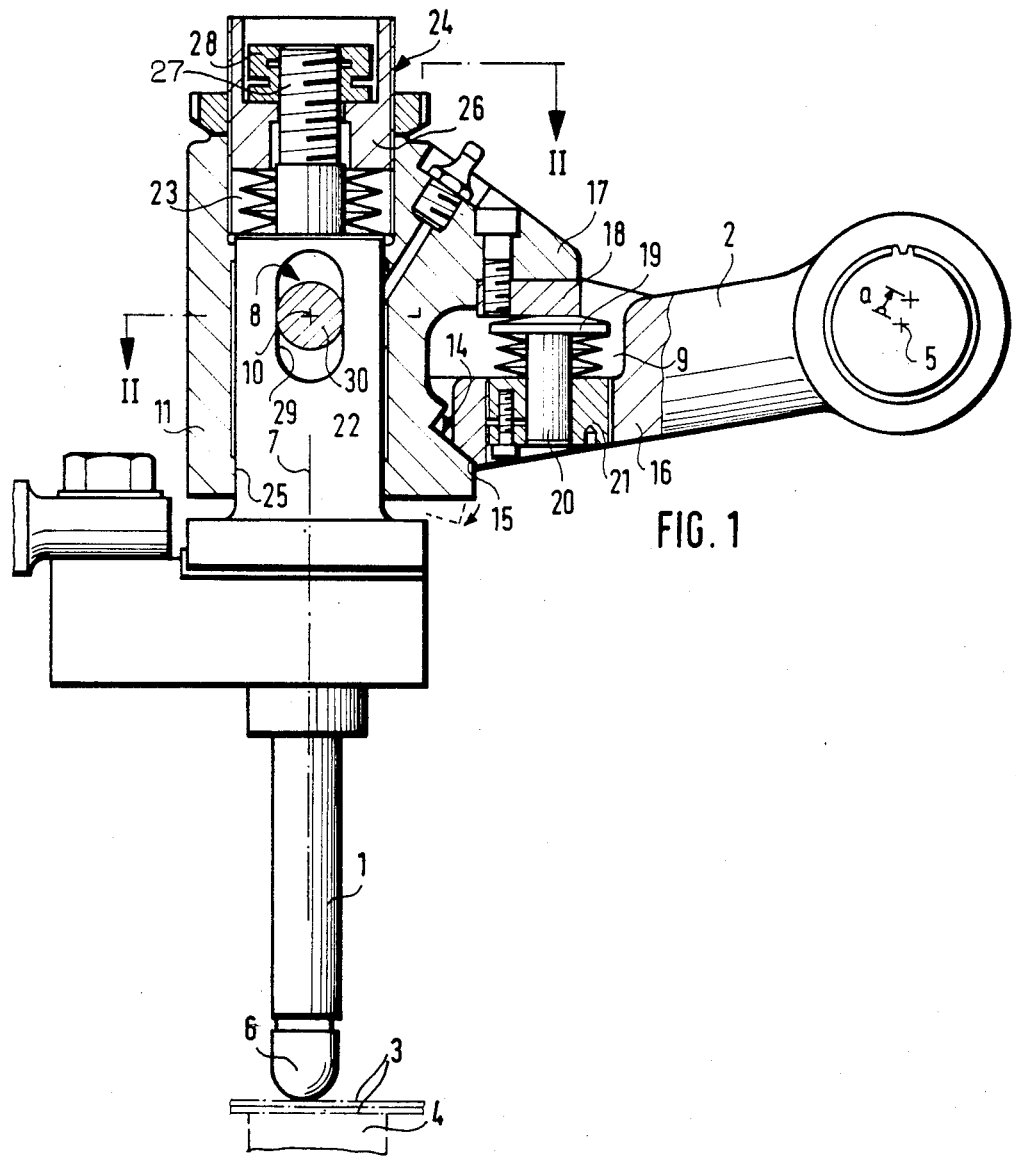
FIG. 1 is a side elevational view, partly in cross section, of the pivot arm of a first embodiment of a welding apparatus in accordance with the present invention.

Referring now to the drawing wherein like reference numerals are used to designate like parts throughout the various views, of the resistance welding apparatus only the pivot arm 2 (FIGS. 1 and 2), respectively, 2' (FIG. 3) is illustrated in the drawing which carries the welding electrode 1. The apparatus serves for welding together sheet metal parts 3 which are indicated in FIG. 1 between the copper base 4 and the welding electrode 1.

The pivot arm 1 is adapted to be driven about the axis 5 in order to guide the welding electrode 1 to the sheet metal parts 3 and to be able to exert the necessary welding pressure. In particular, when the pivot arm 1 is provided at the end of a welding robot equipped with several articulations and displaceable in a machine frame, it is unavoidable that the "last" pivot axis 5 moves under the reaction force of the contact pressure exerted at the work to be welded, as is indicated in FIG. 1, for example, by the distance a shown on an exaggerated large scale. This movement would lead to a strong bending stress of the welding electrode 1 which is already placed with a considerable contact pressure on the sheet metal parts 3. This not only leads to a premature destruction of the welding electrode 1 but also—if it has been bent—to an inadequate repeatability accuracy of the spot welding. If it comes to a lateral slipping away of the electrode tip ("erasing"), a considerably additional wear occurs, whereby additionally the welding spot is placed at the wrong location.

The welding electrode 1 which extends approximately perpendicularly to the longitudinal dimension of the pivot arm 2, is therefore pivotal within limits with respect to the pivot arm 2 against a spring force by way of an articulation or joint generally designated by reference numeral 8 arranged approximately in the electrode axis.

The spring force to be described more fully hereinafter—the cup spring packet 9—assures, on the one hand, that the welding electrode 1 assumes an accurately defined position relative to the pivot arm 2 in the starting position (until placed on the welding work), which is important for the spot accuracy during welding. On the other hand, the spring force enables a limited pivoting of the welding electrode 1 relative to the pivot arm 2 so that during the migration of the "last" pivot axis 5, for example, in the direction of the distance a, the angle between the welding electrode 1 and the pivot arm 2 can increase. This leads to a considerable reduction of the aforementioned harmful stresses of the welding electrode and avoids the also described "erasing."

Frequently, the "last" pivot axis 5 will move in the plane of the drawing; however, it may also move perpendicular thereto or at an inclination to this plane. For that reason, it is also possible to provide a ball joint or a universal joint between the welding electrode 1 and the pivot arm 2, about which the two parts are pivotal within limits against a spring force.

In the illustrated embodiment, one direction of movement predominates. For that reason, the joint 8 is a pure swivel or hinge joint with an axis of rotation 10 perpendicular to the electrode axis 7. If the movement of the pivot axis 5 takes place, as indicated in FIG. 1, predominantly in the plane of the drawing, then the axis of rotation 10 extends appropriately in parallel to the pivot axis 5 of the pivot arm 2.

Figure 2:
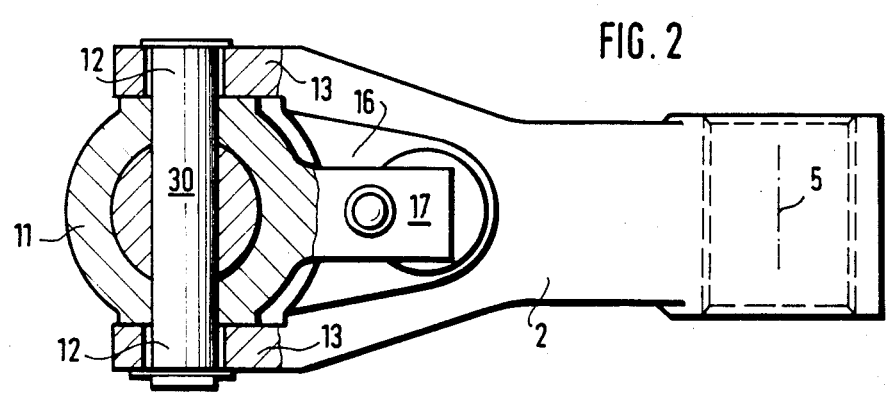
FIG. 2 is a cross-sectional view taken along line II—II of FIG. 1.

In the first embodiment illustrated in FIGS. 1 and 2 of the drawing, the welding electrode 1 is supported (indirectly) in a pivot support 11 which in turn is pivotal within limits with respect to the pivot arm 2.

As can be seen in particular in FIG. 2, this takes place preferably in such a manner that the pivot support 11 is connected by way of two lateral joint hinges 12 with the legs 13 of the pivot arm 2 which is U-shaped at the free end thereof, whereby the legs 13 surround the pivot support 11 fork-like.

According to FIG. 1, the pivot support 11 and the pivot arm 2 have mutually coordinated abutment surfaces 14 and 15, at which they are pressed against each other in the normal position by the cup spring packet 9. This assures a precise starting position of the electrode tip 6 prior to each welding operation.

In the embodiment illustrated in FIGS. 1 and 2, the cup spring packet 9 is arranged in the web area 16 of the U-shaped end of the pivot arm 2. An extension 17 of the pivot support 11 which is directed toward the pivot axis 5 of the pivot arm 2, acts against the cup spring packet 9. The extension 17 is equipped for that purpose at the bottom thereof with a wear-resistant plate 18 which acts against the pressure plate 19 of a guide pin 20 that is spherically shaped at the top. The cup springs of the cup spring packet 9, which surround the guide pin 20, are adapted to be prestressed by means of a nut 21 screwed in within the web area 16 and adapted to be tightened against this web area. The prestress can thus be adjusted and possibly readjusted.

In the embodiment illustrated in FIG. 1, a mounting member 22 carrying the welding electrode 1 is provided which in turn is displaceable with respect to the pivot support 11 parallel to the electrode axis 7 against the effect of a further spring element 23. The displacement of the mounting member 22 under the action of the further spring element 23 is limited by an adjustable stop generally designated by reference numeral 24 which fixes the starting position of the spring-loaded mounting part 22 relative to the pivot support 11. The adjustable stop 24 is formed by a stop nut 26 adapted to be screwed into a bore 25 of the pivot support 11 coaxial to the electrode axis 7. The stop nut 26 encloses between itself and the mounting member 22 displaceable in the bore 25, the spring element 23 which is formed by a further cup spring packet. This stop nut 26 is traversed by a threaded extension 27 of the mounting member 22 which carries a tightening nut 28 cooperating with the stop nut 26.

It can be readily seen from FIGS. 1 and 2 that the already described hinge pins 12 are formed by a knock-out spindle 30 extending through the legs 13 of the pivot arm 2, the pivot support 11 and an elongated aperture 29 of the mounting member 22.

The further spring element 23 is also prestressed by the contact pressure of the welding electrode 1 on the welding work, whereby the mounting member 22 is displaced slightly upwardly with respect to the pivot support 11. The spring element 23 brings about that the successive positioning of the electrode tip during the welding operation takes place parallel to the electrode axis 7 so that this repositioning cannot initiate any lateral loads and stresses of the welding electrode 1, respectively, of the electrode tip 6 and also avoids the aforementioned "erasing."

Figure 3:
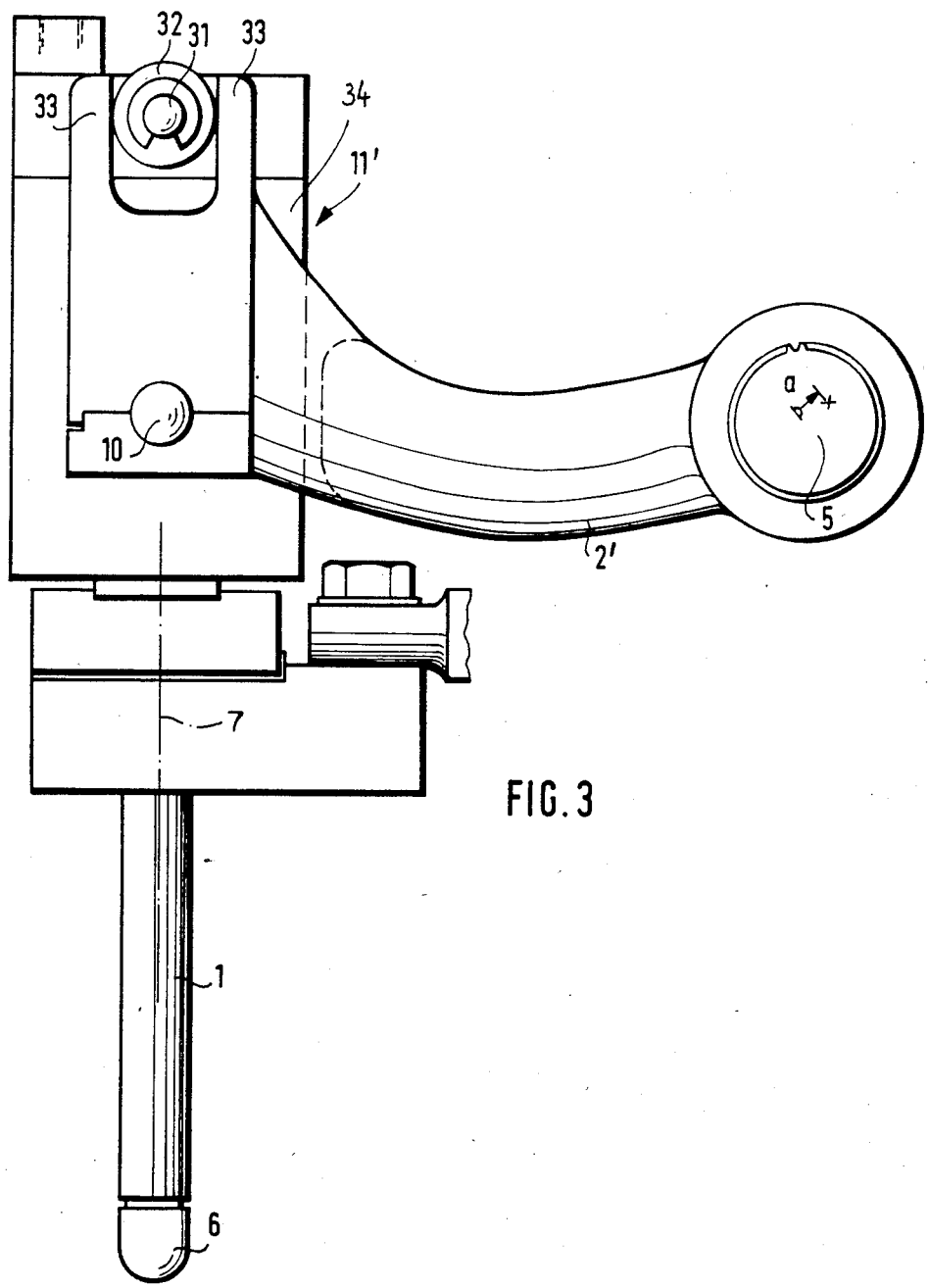
FIG. 3 is a side elevational view, similar to FIG. 1, of a second embodiment of a resistance welding apparatus in accordance with the present invention.

As can be seen from the further embodiment illustrated in FIG. 3, the pivot support 11' may include at least one support pin 31 at a distance and parallel to the axis of rotation 10, which carries a rubber sleeve 32 as spring element that permits an elastic and limited pivoting of the pivot support 11' with respect to the pivot arm 2'. This rubber sleeve 32 is surrounded by retaining fingers 33 of the pivot arm 2'.

In the embodiment according to FIG. 3, the pivot support 11' is formed by a welding cylinder 34 coaxial to the electrode axis 7.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A resistance welding apparatus, comprising an actuatable pivot arm, a welding electrode carried by said pivot arm, said welding electrode extending at least approximately perpendicularly with respect to the pivot arm and being displaceable within limits with respect thereto against a spring force, and joint means arranged approximately in the electrode axis to enable pivotal movement of the welding electrode with respect to the pivot arm in response to elasticities and bearing play forces in the welding operation.

2. An apparatus according to claim 1, wherein said joint means is a swivel joint with an axis of rotation substantially perpendicular to the electrode axis.

3. An apparatus according to claim 2, wherein the axis of rotation extends substantially parallelly to the pivot axis of the pivot arm.

4. An apparatus according to claim 3, further comprising pivot support means for supporting the welding electrode, said pivot support means being pivotal within limits with respect to the pivot arm.

5. An apparatus according to claim 4, wherein said pivot support means is connected with two legs of the pivot arm U-shaped at one end thereof by way of two lateral pivot pins, said two legs surrounding the pivot support means fork-like.

6. An apparatus according to claim 5, wherein the pivot support means and the pivot arm include mutually coordinated abutment surface means, said pivot support means and said pivot arm being pressed against one another at said abutment surface means in a rest position by spring means.

7. An apparatus according to claim 6, wherein said spring means is formed by a cup spring packet.

8. An apparatus according to claim 6, wherein an angle subtended in the rest position by the pivot arm and the welding electrode is adapted to be enlarged in against the action of the spring means.

9. An apparatus according to claim 8, wherein said spring means is arranged within an area of the U-shaped end of the pivot arm, an extension of the pivot support means directed toward the pivot axis of the pivot arm acting against said spring means.

10. An apparatus according to claim 9, wherein said spring means is adjustable in its prestress.

11. An apparatus according to claim 9, further comprising mounting means carrying the welding electrode, said mounting means being displaceable in its turn with respect to the pivot support means substantially parallelly to the electrode axis against the action of a further spring means.

12. An apparatus according to claim 11, further comprising an adjustable stop means which determines the starting position of the spring-loaded mounting means relative to the pivot support means.

13. An apparatus according to claim 12, wherein the adjustable stop means is formed by a stop nut adapted to be screwed into a bore of the pivot support means disposed substantially coaxially to the electrode axis, said stop nut enclosing between itself and said mounting means which is displaceable in the bore, the further spring means, the stop nut being traversed by a threaded extension of the mounting means which carries a clamping nut cooperating with the stop nut.

14. An apparatus according to claim 11, wherein the pivot pins are formed by a knock-out spindle extending through the legs of the pivot arm, the pivot support means and an elongated aperture of the mounting means.

15. An apparatus according to claim 4, wherein the pivot support means includes at least one support pin at a distance and parallel to the axis of rotation, said support pin carrying a rubber sleeve as spring means which is surrounded by retaining fingers of the pivot arm.

16. An apparatus according to claim 4, wherein the pivot support means is formed by a welding cylinder disposed substantially coaxially to the electrode axis.

17. An apparatus according to claim 1, further comprising pivot support means for supporting the welding electrode, said pivot support means being pivotal within limits with respect to the pivot arm.

18. An apparatus according to claim 17, wherein said pivot support means is connected with two legs of the pivot arm U-shaped at one end thereof by way of two lateral pivot pins, said two legs surrounding the pivot support means fork-like.

19. An apparatus according to claim 17, wherein the pivot support means and the pivot arm include mutually coordinated abutment surface means, said pivot support means and said pivot arm being pressed against one another at said abutment surface means in a rest position by spring means.

20. An apparatus according to claim 19, wherein an angle subtended in the rest position by the pivot arm and the welding electrode is adapted to be enlarged in against the action of the spring means.

21. An apparatus according to claim 18, wherein a spring means is arranged within an area of the U-shaped end of the pivot arm, an extension of the pivot support means directed toward the pivot axis of the pivot arm acting against said spring means.

22. An apparatus according to claim 21, wherein said spring means is adjustable in its prestress.

23. An apparatus according to claim 17, further comprising mounting means carrying the welding electrode, said mounting means being displaceable in its turn with respect to the pivot support means substantially parallelly to the electrode axis against the action of a further spring means.

24. An apparatus according to claim 23, further comprising an adjustable stop means which determines the starting position of the spring-loaded mounting means relative to the pivot support means.

25. An apparatus according to claim 24, wherein the adjustable stop means is formed by a stop nut adapted to be screwed into a bore of the pivot support means disposed substantially coaxially to the electrode axis, said stop nut enclosing between itself and said mounting means which is displaceable in the bore, the further spring means, the stop nut being traversed by a threaded extension of the mounting means which carries a clamping nut cooperating with the stop nut.

26. An apparatus according to claim 18, wherein the pivot pins are formed by a knock-out spindle extending through the legs of the pivot arm, the pivot support means and an elongated aperture of the mounting means.

27. An apparatus according to claim 17, wherein the pivot support means is formed by a welding cylinder disposed substantially coaxially to the electrode axis.

* * * * *